Dec. 22, 1936.                J. T. BARKELEW ET AL                2,065,261
                                      JAR
                              Filed Jan. 14, 1935          7 Sheets-Sheet 1

Inventors
James T. Barkelew,
Victor E. Ehrgott.

Attorney.

Dec. 22, 1936.  J. T. BARKELEW ET AL  2,065,261
JAR
Filed Jan. 14, 1935   7 Sheets-Sheet 3

Inventors
James T. Barkelew,
Victor F. Ehrgott.

Attorney.

Dec. 22, 1936. J. T. BARKELEW ET AL 2,065,261

JAR

Filed Jan. 14, 1935 7 Sheets-Sheet 4

Inventors
James T. Barkelew,
Victor F. Ehrgott.

Attorney.

Dec. 22, 1936.  J. T. BARKELEW ET AL  2,065,261
JAR
Filed Jan. 14, 1935  7 Sheets-Sheet 5

Inventors
James T. Barkelew,
Victor F. Ehrgott.

Attorney.

Dec. 22, 1936.  J. T. BARKELEW ET AL  2,065,261
JAR
Filed Jan. 14, 1935  7 Sheets-Sheet 7

Inventors
James T. Barkelew,
Victor F. Ehrgott.

Attorney.

Patented Dec. 22, 1936

2,065,261

UNITED STATES PATENT OFFICE 2,065,261

JAR

James T. Barkelew, Pasadena, and Victor F. Ehrgott, Los Angeles, Calif., assignors to John Grant, Los Angeles, Calif.

Application January 14, 1935, Serial No. 1,626

21 Claims. (Cl. 255—27)

This invention has to do with well drilling jars comprising a telescopic mandrel and body and operating by straight up and down movement of the drill pipe to be released to deliver the jarring blow and then be reset for a subsequent jarring operation.

In one of its general aspects, the invention aims broadly at the provision of a novel type of jar in which release of the parts for jarring impact is effected by straining, preferably compressing, a longitudinally deformable member which in its normal condition prevents releasing disengagement of the locking or detent elements. In jars of the type herein dealt with, the detent elements are released by relative rotation after predetermined compression of the deformable element produced by the pull exerted on the drill pipe.

In another of its broad general phases, the invention deals with a novel type of rotative release in which the detent elements pass by relative rotation while the mandrel and body are splined or otherwise held against substantial relative rotation, in distinction to the usual types of rotative release jars which require, at least during release, relative rotation between the body and mandrel. This general type of release by relative rotation of the locking or detent elements with the body and mandrel held against relative rotation, is disclosed in our copending application Ser. No. 1,627, filed on even date herewith on Rotary jars, in which there is illustrated a jar having the relatively rotating detent lugs integral with the body and mandrel so that the release necessitates a torsional strain on the mandrel. According to the present invention, the mandrel carried lug, instead of being integral with the mandrel, is rotatively connected thereto, as by being formed integrally with a rotative mandrel surrounding sleeve. Also, instead of the rotative lug release being restrained by torsional strain of the mandrel, such release is imposed by a longitudinally deformable member, as above mentioned, or, as in a later described variational form, by radial strain of the body.

While the various objects and features of the invention might be set out preliminarily at some length, it is believed that a better and more ready understanding of the invention, together with all these features and objects, may be had by proceeding directly to a detailed description of certain typical and illustrative forms. For purposes of description, reference is made to the accompanying drawings in which:

Before describing specifically the different illustrated forms of the invention, it may be mentioned that they possess in common the general characteristic of engaging body and mandrel lugs releasable by relative rotation while the body and mandrel remain relatively non-rotatable, and a means restraining such rotational release until a predetermined pull is exerted on the drill pipe and mandrel. In the form of invention illustrated in Figs. 1 to 12, release of the body and mandrel lugs is restrained by positive lock action, and the lock in turn is released by virtue of predetermined strain, resulting from the upward pull on the mandrel, of a longitudinally deformable element. In the form illustrated in Figs. 13 to 24 inclusive, release of the body and mandrel lugs is yieldingly resisted directly by the deformable element through the intermediary of a cam. In the last illustrated form shown in Figs. 26 to 31, inclusive, the lug release is yieldingly restrained by radial expansion of the body through escapement detents, as will later be described in detail.

Referring specifically now to the form shown in Figs. 1 to 12, the jar body 10 comprises three tubular sections 10a, 10b and 10c, connected by double-pin couplings 11 and 12. The mandrel 13 is made in upper and lower sections 14 and 15, the former being attached at 16 to the drill pipe 17 leading to the ground surface, while the lower section 15 is connected below the jar in the usual manner through a length of drill pipe with a bit or fishing tool, not shown. Relative rotation between the body and upper mandrel section is prevented by longitudinal mandrel splines 18 extending through ways 19 in coupling 11. Normally spaced annular striking shoulders 20 and 21 are formed on the head of the body and enlargement 14a of mandrel section 14, respectively, these striking shoulders being brought into engagement to deliver the jarring flow by sudden upward movement of the mandrel, as will hereinafter appear. During drilling, when at least a part of the weight of upper drill string 17 is transferred through the jar to the bit below, the bottom tapered shoulder 23 of mandrel enlargement 14a seats upon a correspondingly tapered shoulder 24 on the upper end of coupling 11.

Figures 1, 2:
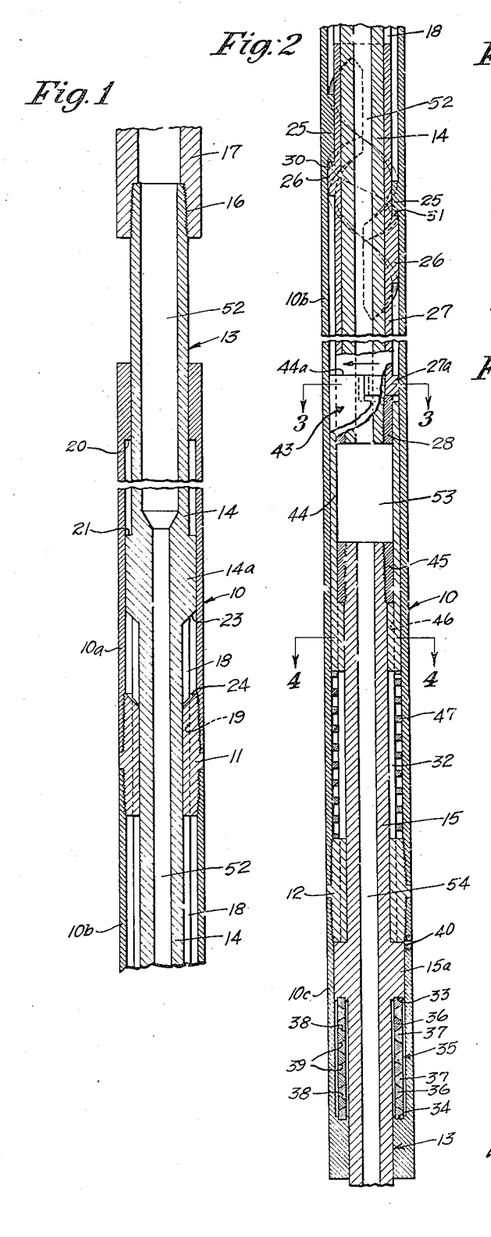
Figures 1 and 2 are longitudinally continuing sectional views illustrating one form of jar embodying the invention, with the parts in positions at the start of the jarring operation.

In the position of the parts shown in Figs. 1 and 2, upper mandrel section 14 is releasably held against relative upward movement within the body by parts including relatively rotatable spiral shoulders or lugs 25 and 26 on the body and mandrel, respectively. As shown most clearly in Figs. 2 and 10 to 12, each of these lugs is a 360° spiral and has with the other, full 360° angular surface engagement when in alinement as in Figs. 2 and 10. As illustrated, the body lug is tapered toward its lower end, and the mandrel lug toward its upper end, the configurations of the two however being the same so that in any axial plane of the body the combined lug width will be the same. The upper and lower ends of the body and mandrel lugs are beveled at 25a and 26a, respectively, in order to cause proper reengagement and relative positioning of the lugs after the jarring release and during downward return movement of the mandrel for resetting.

Figure 3:
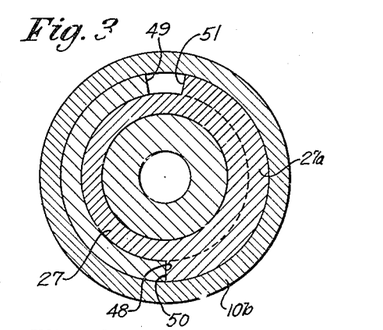
Figs. 3 and 4 are enlarged sections on lines 3—3 and 4—4, respectively, of Fig. 2.
Figure 4:
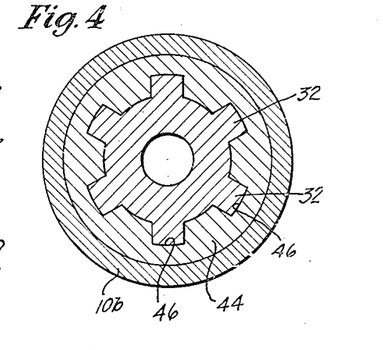

Lugs 26 are carried on the mandrel so as to be rotatable relative thereto, and as a preferred mounting for the lugs we form them integrally with a rotating mandrel sleeve 27. The sleeve is combined in fixed longitudinal position on the mandrel, though with sufficient looseness to permit free rotation, between the lower ends of mandrel spline 18 and the top shoulder of a nut 28 threaded on the lower end of the upper mandrel section 14. As shown in Fig. 3, the lower end of lug sleeve 27 has an arcuate flange lug 27a, acting, as hereinafter described, with a lock element to releasably hold the sleeve against rotation.

By virtue of their full 360° extent, lugs 25 and 26 have maximum surface engagement and strength to take the full load exerted on the drill pipe at the start of the jarring operation. The angularity of the engaging surfaces 30 and 31 being greater than the coefficient of friction between the shoulders, sleeve 27 tends to rotate about the mandrel in the direction of the arrow in Figs. 2 and 3, when an upward pull is exerted on the mandrel, and rotates through 360° past the body lug during the period of release as later described.

Figures 7, 9:
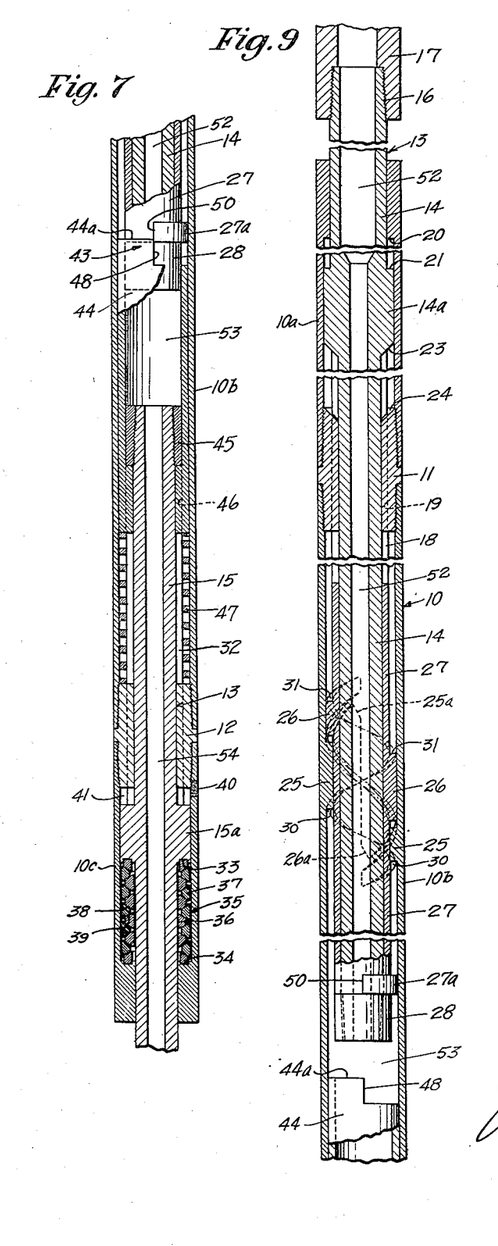
Fig. 7 is a fragmentary section showing the lock and associated parts at substantially the point of release.
Fig. 9 is a section showing the position of the parts in the upper portion of the jar after the spiral mandrel lug has been released for rotation and has turned 360° relative to the spiral body lug.
Figure 8:
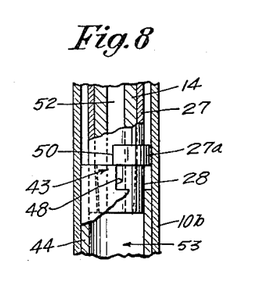
Fig. 8 is a fragmentary section showing the position of the lock parts immediately after release.
Figure 10:
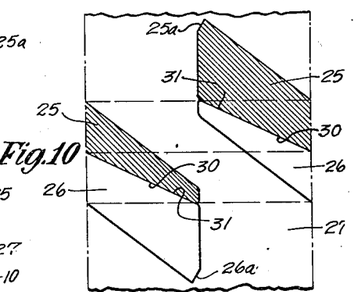
Figs. 10 to 12 are developed views showing the relative positions of the body and mandrel lugs at various stages in the jar operation.

Mandrel section 15 is also longitudinally movable within the body to a limited extent and is held against relative rotation by splines 32 extending through longitudinal ways in coupling 12. Below the coupling, an enlargement 15a is formed on the mandrel, and this mandrel enlargement, together with the lower end of the body, provides spaced annular shoulders 33 and 34 between which is confined a longitudinally deformable (compressible) medium or member 35. It will be understood that the deformable member 35 may consist of any suitable resilient medium capable of longitudinal compression upon upward movement of the body relative to the mandrel, and which possesses such resistance as to require the exertion of a pull on the well pipe of sufficient magnitude for the jarring operation, before it will compress to the point of releasing the later described locking element. We have shown as a typical compression element, a spring of the multiple wedge ring type comprising a series of rings 36 and 37 surrounding the mandrel and engaging along annular inclined surfaces 38 and 39 of opposite angularity. Upon longitudinal compression, adjacent wedge rings are radially compressed and expanded in the manner characteristic of this type of spring, as shown in Fig. 7. In order to check expansion of the spring, after compression and during the jarring operation, a small bleed port 40 may be provided to restrict the escape of air from space 41, see Fig. 7, between the mandrel enlargement 15a and coupling 12.

Until the compression element 35 has been compressed to a predetermined extent, and consequently until a predetermined pull load has been exerted on the mandrel, release of shoulders 25 and 26, and substantial rotation of sleeve 27 on the mandrel, are prevented by a lock, generally indicated at 43, whose operation to release the sleeve for rotation depends upon compression of spring 35. The locking device 43 comprises a sleeve 44 carried on the lower mandrel section 15, and which in the position of Fig. 2, telescopes over the lower end of the upper mandrel section. Sleeve 44 is limited in its uppermost position by engagement with nut 45 on the upper end of mandrel 15, and is non-rotatively connected to the mandrel by splines 32 extending through ways 46, see Fig. 4. The sleeve however is longitudinally movable relative to the lower mandrel section, and is yieldably supported by a comparatively weak spring 47 bearing at its lower end against coupling 12. The upper end of sleeve 44 is notched to longitudinally overlap flange lug 27a of sleeve 27, and to provide vertical stop shoulders 48 and 49 (Fig. 3) adapted to engage similar shoulders 50 and 51 on lug 27a. In the position of Fig. 2, it will be seen that rotation of sleeve 27 in the direction indicated by the arrow is prevented by the engagement of lug shoulder 50 with lock sleeve shoulder 48, and that for sleeve 27 to be released for rotation, the lock sleeve must move relatively downward to the point at which shoulders 48 and 50 will clear.

Downward passage of circulating fluid through the jar may be maintained at all times by way of upper mandrel bore 52, space 53 between the mandrel section, and bore 54 extending through the lower mandrel.

As in the usual jarring operation, an upward pull is exerted on the drill pipe, producing a considerable longitudinal stretch in the pipe. Figs. 1 and 2 illustrate the positions of the jar parts at this time, with lock 43 holding sleeve 27 against rotation and with the mandrel and body lugs 25 and 26 in longitudinal alinement, see also Fig. 10. Due to the upward pull on the mandrel, the sleeve carried lug 26 tends to rotate upwardly past the body lug, but in being held against rotation it transmits the pull to the body as an upwardly applied stress tending to compress spring 35. The lower mandrel section is attached to the object lodged in the well and is therefore held against upward movement. The length of vertical overlap between the lock and sleeve lug shoulders 48 and 50 determine the extent to which spring 35 must be compressed prior to release, and consequently the maximum pull load to be exerted through the drill pipe. Fig. 7 illustrates the position of the lock and associated parts nearing the point of release, and Fig. 8 the relative positions of the lock sleeve and lug 27a immediately after shoulders 48 and 50 have cleared.

Figure 11:
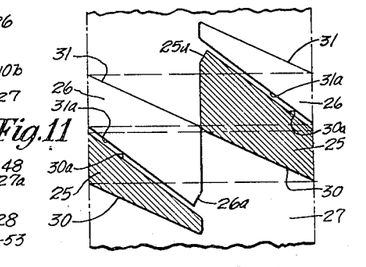

Sleeve 27 is now freed for rotation, and during the course of lug release, rotates through 360° to bring the lugs in the relative positions of Figs. 9 and 11 in which the mandrel lugs 26 are now above the body lugs and the upper mandrel and sleeve assembly are instantly freed for upward travel to the point at which striking shoulders 20 and 21 will come into engagement and deliver the jarring blow. The blow in this case is communicated through the body and the lower mandrel section to the object lodged in the well.

Figures 5, 6:
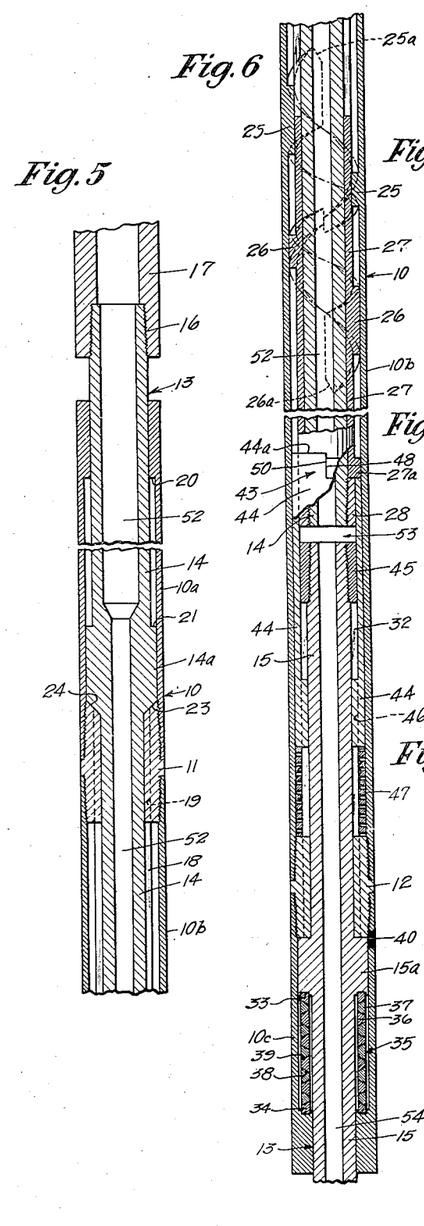
Figs. 5 and 6 are sectional views similar to Figs. 1 and 2, showing the position of the jar parts during drilling.
Figure 12:
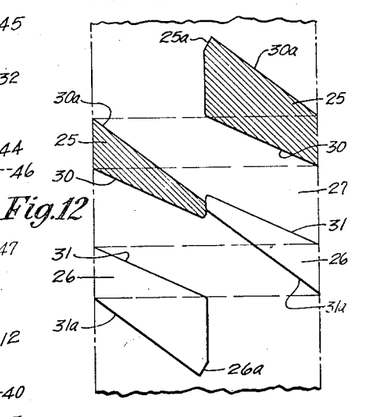

The jar parts are now reset for a subsequent jarring operation and to bring the body and mandrel lugs into locked reengagement, by straight downward movement of the upper mandrel section to the positions of Figs. 5 and 6. During the course of the downward mandrel travel, the lower inclined shoulder 31a of mandrel lug 26 first contacts upper shoulder 30a of the body lug, and continued downward travel of the mandrel causes the mandrel lug and sleeve to rotate 360° in a direction opposite that of rotation during the release, to the point at which the mandrel lugs have again moved beneath and in alinement with the body lug. When the mandrel has reached its lowermost position with shoulder 23 seating on the upper end 24 of coupling 11, the mandrel lugs will have moved somewhat below the body lugs, though remaining substantially in alinement therewith, as illustrated in Fig. 12. During the resetting operation, mandrel sleeve lug 27a comes into engagement with the upper end 44a of lock sleeve 34, pressing the sleeve down against the resistance of spring 47 until shoulders 48 and 50 come into alinement, at which point the lock sleeve snaps up to the position of Fig. 6. By now pulling up on the mandrel, the parts may be returned to the positions of Figs. 1 and 2, ready for a second jarring operation.

Figures 13, 14, 15, 16:
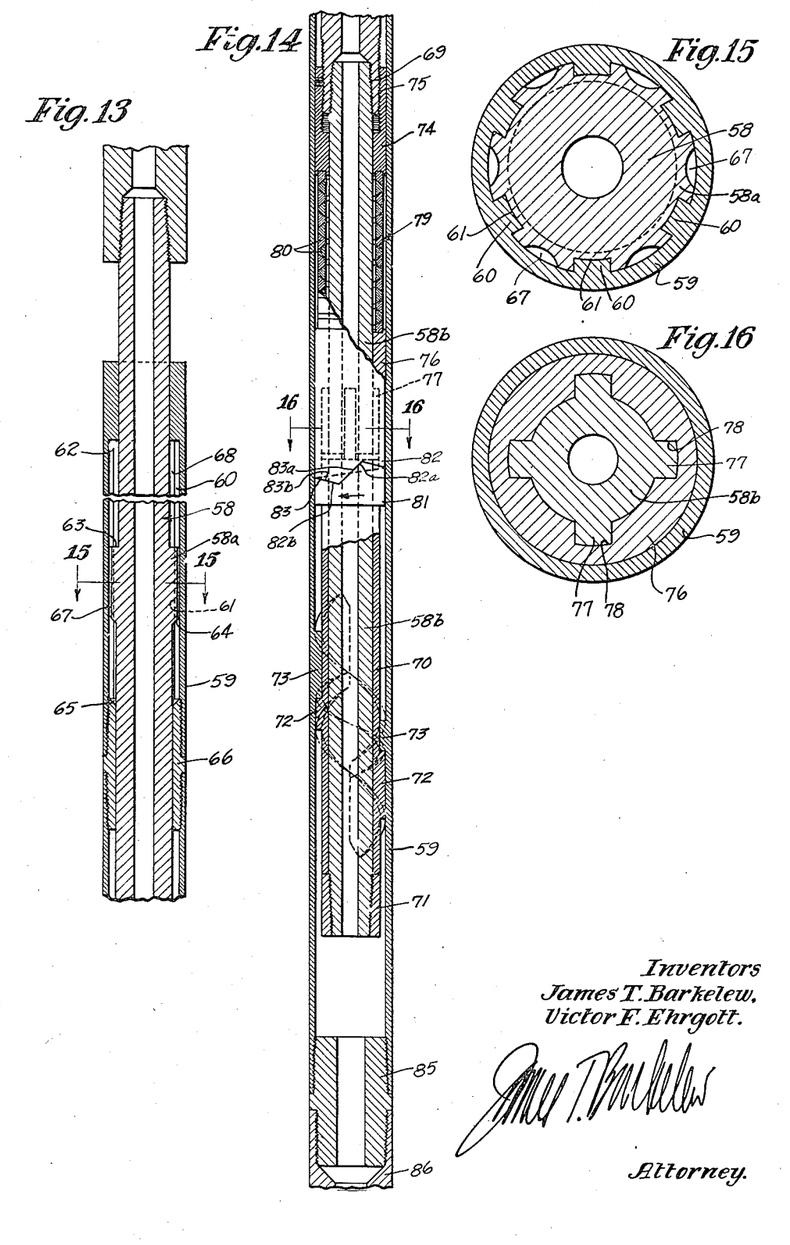
Figs. 13 and 14 are views similar to Figs. 1 and 2, but showing a variational form of the invention.
Figs. 15 and 16 are enlarged sections on lines 15—15 of Fig. 13 and 16—16 of Fig. 14, respectively.

While characteristically similar to the described embodiment of the invention, the variational form of Figs. 13 to 25 differs in certain respects, among which, as previously mentioned, is the provision of a type of release in which relative rotational disengagement of the mandrel and body lugs is directly and yieldably resisted by the compression elements through the intermediary of a cam, instead of being positively arrested up to the point of release by a lock as in the described form. In Figs. 13 and 14, the mandrel 58 is non-rotatably connected to the body 59 by interior longitudinally extending body splines 60 extending through ways 61, see Fig. 15, formed in the mandrel enlargement 58a. As in the first described form, striking shoulders 62 and 63 are provided on the body and mandrel enlargement, and in the drilling position of Figs. 20 and 21, mandrel shoulder 64 seats on shoulder 65 formed by the upper end of body coupling 66. Fluid bypass channels 67 extend longitudinally through the mandrel enlargement 58a to allow the escape, during the jarring operation, of fluid contained within space 68 and which might otherwise tend to retard the jarring travel of the mandrel.

The upper mandrel portion 58a is screwthreadedly connected at 69 to a lower portion 58b carrying a rotatable sleeve 70 engaged at its lower end by a nut 71. Sleeve 70 carries an integral spiral lug 72 engaging spiral body lug 73, the shape, relative arrangement and operation of the lugs being similar in all respects to lugs 25 and 26 of the first described form. A sleeve 74, overlapping the mandrel sections at joint 69, is screwthreaded at 75 on the lower end of section 58a, and spaced below sleeve 74 is a second, relatively longitudinally movable sleeve 76. The latter is connected to the mandrel and held against rotation relative thereto, by mandrel spline 77 extending within ways 78 formed in the inner face of the sleeve, see Figs. 16 and 17.

Here the deformable element 79, shown typically as a mandrel surrounding spring 80 of the previously described type, is confined between sleeves 74 and 76, and is subjected to compression as the result of upward movement of sleeve 76 on the mandrel, as will presently appear. The tension on spring 80, and consequently the resistance offered by the spring to the pull load exerted to the drill pipe, is variable by adjusting the position of sleeve 74 longitudinally of the mandrel.

Figures 17, 18, 19, 25:
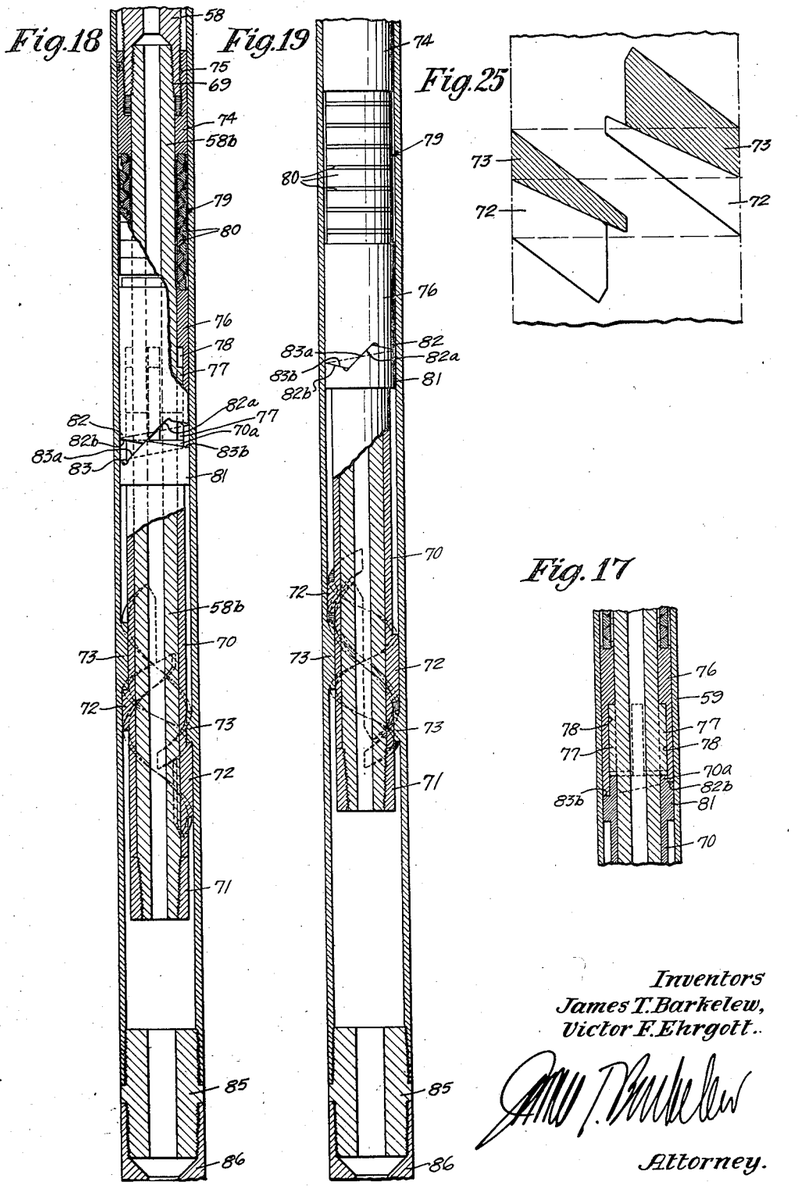
Fig. 17 is a fragmentary section showing the spline connection between the mandrel and the rotatively stationary cam sleeve.
Fig. 18 is a view similar to Fig. 14 showing the cam parts at the point of release.
Fig. 19 shows the parts of Fig. 18 partly in elevation, with the lug carrying mandrel sleeve rotated to the point of release from the spiral body lug.
Figs. 22 to 25, inclusive, are developed views showing the relative positions of the body and mandrel carried lugs at various stages of operation, as illustrated by the various positions of the jar parts in Figs. 13 to 21.

As shown in Fig. 17, the lower end of sleeve 76 in the position of Fig. 14, overlaps the upper end portion 70a of sleeve 70 above the sleeve enlargement or flange 81. The lower end 82 of sleeve 76 and the upper shoulder 83 of flange 81 are shaped to form cam surfaces including correspondingly shaped shoulders 82a, 83a, see Fig. 18, of relatively great angularity, and shoulders 82b, 83b having relatively less angularity. Thus rotation of sleeve 70 in the direction indicated by the arrow in Fig. 14, is resisted by the engagement of cam shoulders 82a, 83a, rotation of the sleeve in an opposite direction being resisted by the cam shoulders 82b and 83b.

In the operation of the jar, starting with the parts in the positions of Figs. 13 and 14, an upward pull on the mandrel is transmitted through the interengaging lugs 72 and 73 to the body 59, and thence through coupling 85 to lower section 86 of the drill pipe string and to a bit or other tool attached to the pipe. An upward pull on the drill pipe tends to rotate sleeve 70 in the direction indicated by the arrow and to cause cam shoulder 83 to rotate past shoulder 82a toward the position of Fig. 18. Such relative rotation between the cam shoulders however is resisted by springs 80, since sleeve 76 must be displaced upwardly and spring 80 compressed a predetermined distance before the cam shoulders will reach the point of release. Consequently the resistance to compression offered by spring 80 determines the maximum pull to be exerted on the drill pipe to trip the jar.

Figures 20, 21, 22, 23, 24:
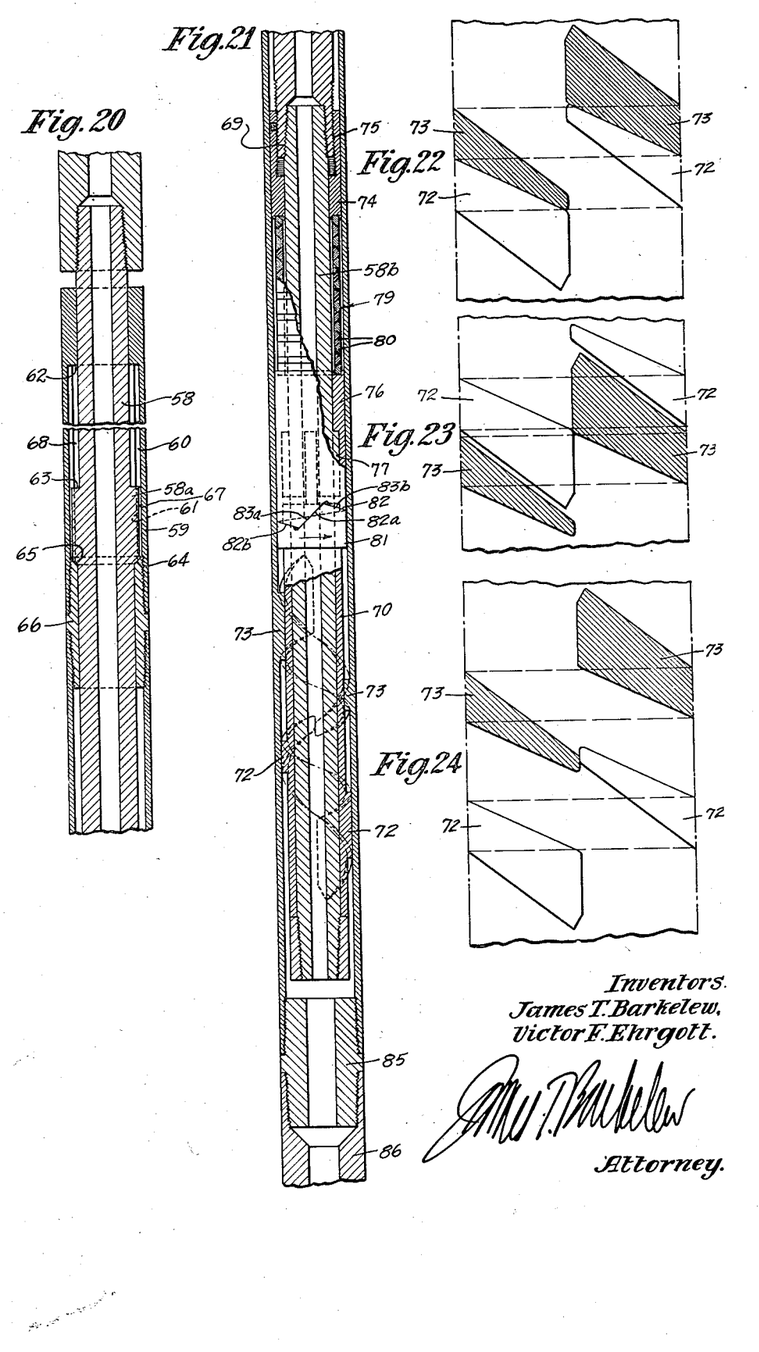
Figs. 20 and 21 are similar to Figs. 13 and 14, showing the position of the parts after the jarring operation and after the mandrel has been lowered to the drilling position.

Fig. 18 shows the positions of the parts just before release, that is just before cam shoulder 83a rides past shoulder 82a. Fig. 22 illustrates the relative positions of mandrel and body lugs 72 and 73 at the start of the upward pull, and Fig. 25 shows relative positions at the point of release, at which mandrel sleeve 70 has become rotated to the position of Fig. 18.

Disengagement of the cam shoulders 82a and 83a frees mandrel sleeve 70 for rotation, and as a result the sleeve instantly rotates 360° (less the small angle of rotation during disengagement of the shoulders, see Fig. 25) to reverse the positions of the body and mandrel lugs, see Fig. 23, and to free the mandrel for upward movement. When this point is reached, the entire mandrel assembly, including sleeves 70, 74 and 76, and spring 80, instantly travel upward until striking shoulders 62 and 63 come into jarring engagement. Since during release, sleeve 70 rotates through 360°, at the end of which the relative positions of sleeve 76 and flange 81 will be the same as in the starting position of Fig. 14.

In resetting the jar, the mandrel is moved down until lugs 72 come into engagement with the body lugs 73 in positions corresponding to those of Fig. 23. Continued downward movement of the mandrel tends to rotate sleeve 70 in the direction indicated by the arrow in Fig. 21, which is opposite the direction of rotation during release. The return rotation of sleeve 70 is resisted by spring 80 through the engagement of cam shoulders 82b, 83b. However, due to the smaller angularity of these surfaces, as compared with shoulders 82a, 83a, the extent to which spring 80 must be compressed, and consequently the resistance offered to the return rotation of the mandrel lug sleeve, are substantially less than during release. When the mandrel has been lowered to the drilling position of Figs. 20 and 21, the mandrel lugs 72 will have rotated back 360° to clear the body lug and will have become lowered to the positions indicated in Fig. 24. By now lifting the mandrel to the starting position of Fig. 4, the jarring operation may be repeated.

In the further variational form of the invention shown in Figs. 26 to 31, the mandrel sections 88a, 88b have a screwthreaded joint at 89, the mandrel enlargement 88c being splined to the body at 90 and having fluid by-pass channels 91 formed in its outer face as in the last described form. The rotatable mandrel sleeve 92 carrying spiral lugs 93 engaging spiral body lugs 94, both similar to the previously described spiral lugs, is longitudinally positioned on the mandrel between shoulder 95 and nut 96.

Figures 26, 27, 28, 29, 30, 31:
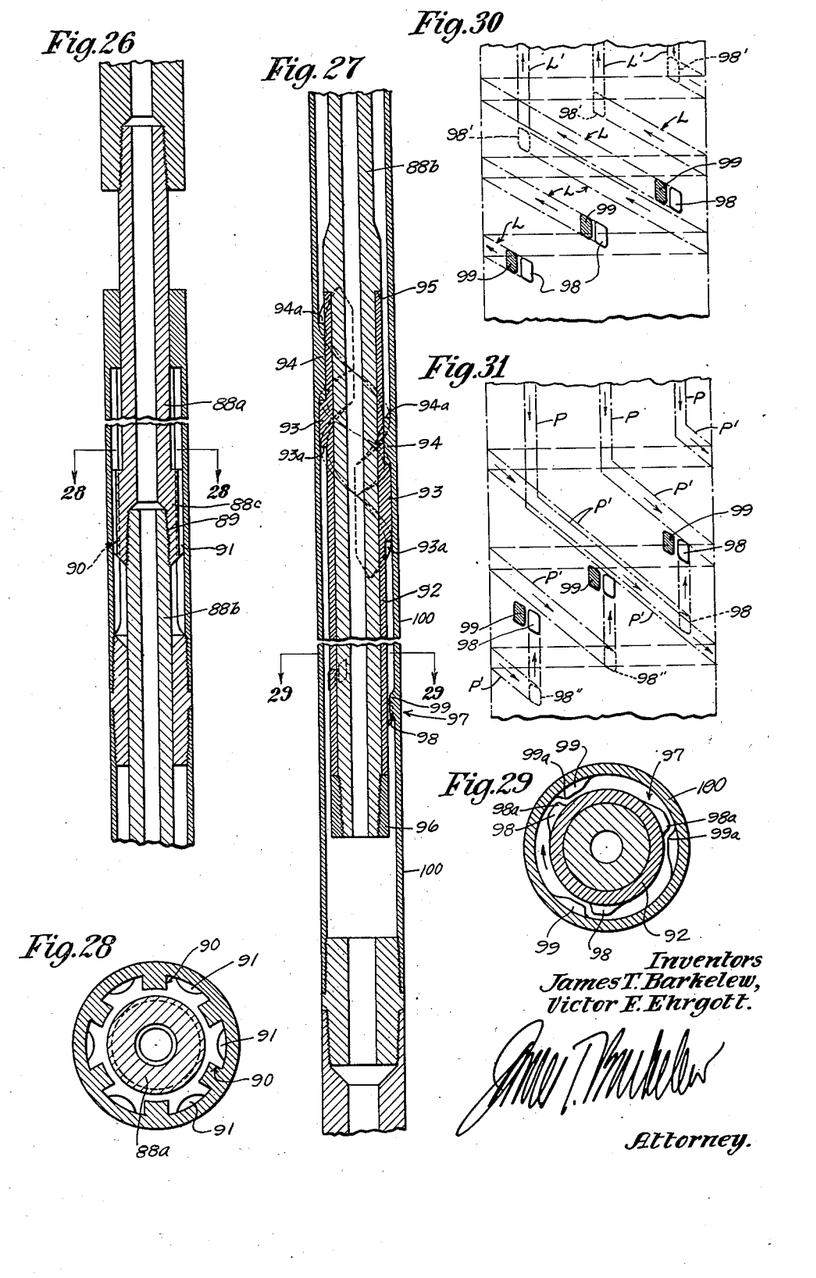
Figs. 26 and 27, in form similar to Figs. 1 and 2, illustrate a further variational form of the invention.
Figs. 28 and 29 are enlarged sections on lines 28—28 of Fig. 26 and 29—29 of Fig. 27.
Figs. 30 and 31 are developed views showing the positions and paths travelled by the escapement detents in the course of the jar operation.

Relative rotational release of the body and mandrel lugs 94 and 93 is yieldably restrained by an escapement, generally denoted at 97, comprising a plurality of radially and vertically offset lugs 98 and 99 integral respectively with sleeve 92 and the body 100, see particularly Fig. 29. These lugs are in overlapping relation longitudinally of the jar, and come into engagement to retard rotation of the mandrel sleeve until a predetermined pull load is exerted through the drill pipe, as will now appear.

An upward pull on the drill pipe tends to rotate sleeve 92 in the direction of the arrow shown in Fig. 29 causing lugs 98 to come into engagement with the body lugs 99. Just prior to engagement, the lugs are in the relative positions shown in Fig. 30. Continued upward pull tending to rotate the mandrel sleeve causes the rounded noses 98a, 99a of the lugs to ride past each other against the resistance of the body 100 to radial expansion. This body resistance and the radial overlap of the escapement lugs of course determines the maximum resistance offered by the escapement to release of the mandrel sleeve for rotation, and the maximum pull load required to be exerted on the mandrel.

The path travelled by sleeve escapement lugs 98 during upward travel of the mandrel and after relative rotation of the escapement lugs past each other, are indicated at L in Fig. 30. When the mandrel sleeve has rotated through 360°, escapement lugs 98 will have reached the positions indicated in Fig. 30 at 98'. Then as the mandrel continues its upward movement, lugs 98 move vertically in paths indicated at L'.

In resetting the jar, after the jarring blow has been delivered, the mandrel is moved down until the bottom shoulder 93a of spiral lug 93 engages the upper shoulder 94a of the body lug. Continued downward movement of the mandrel causes sleeve 92 to rotate in an opposite direction to its starting position, all in a manner similar to the described operation of the mandrel sleeves in the previously discussed forms. It will be seen however that with the spiral mandrel lugs 93 coming above the body lug 94 during their relative rotation in the resetting operation, the escapement lugs 98 and 99 will be correspondingly offset from their relative positions during release rotation of the mandrel sleeve, as above referred to with reference to Fig. 30. By virtue of their relative vertical offset during resetting rotation of the mandrel sleeve, the escapement lugs clear each other and do not come into opposition until the mandrel, after being fully lowered, is raised to its starting position of Fig. 27. Thus during the lowering of the mandrel, escapement lugs 98 first travel straight down through paths P, see Fig. 31, and then, after the spiral body and mandrel lugs come into engagement, travel spiral paths P', which it will be noted, clear the escapement body lugs 99. After reaching their lowermost positions 99'', the escapement lugs travel straight up to their starting position as the mandrel is raised to the position of Fig. 27.

We claim:

1. In a jar, a body and a relatively longitudinally movable mandrel, striking shoulders which are brought into engagement by relative longitudinal movement of the mandrel and body in one direction, a pair of interengaging members restraining the body and mandrel against relative movement in said direction, said members being releasable by relative rotation about the body axis to free the body and mandrel for relative movement in said direction, means rotatably connecting one of said members to the mandrel and holding the member against substantial bodily movement longitudinally of the mandrel, and a connection between the body and mandrel holding them against substantial relative rotation during said relative releasing movement of the members.

2. In a jar, a body and a relatively longitudinally movable mandrel, striking shoulders which are brought into engagement by relative longitudinal movement of the mandrel and body in one direction, a sleeve rotatable on said mandrel, and interengaging shoulders on said sleeve and body restraining the body and mandrel against relative movement in said direction, said shoulders being releasable by relative rotation about the body axis to free the body and mandrel for relative movement in said direction, and a connection between the body and mandrel holding them against substantial relative rotation during said relative releasing movement of the shoulders.

3. In a jar, a body and a relatively longitudinally movable mandrel, striking shoulders which are brought into engagement by relative longitudinal movement of the mandrel and body in one direction, a pair of interengaging, substantially 360° spiral lugs restraining the body and mandrel against relative movement in said direction, said lugs being releasable by relative rotation about the body axis to free the body and mandrel for relative movement in said direction, and a connection between the body and mandrel holding them against substantial relative rotation during said relative releasing movement of the lugs.

4. In a jar, a body and a relatively longitudinally movable mandrel, striking shoulders which are brought into engagement by relative longitudinal movement of the mandrel and body in one direction, a pair of interengaging, substantially 360° spiral lugs restraining the body and mandrel against relative movement in said direction, said lugs being releasable by relative rotation about the body axis to free the body and mandrel for relative movement in said direction, one of said lugs being rotatable with respect to both the body and mandrel, and a connection between the body and mandrel holding them against substantial relative rotation during said relative releasing movement of the lugs.

5. In a jar, a body and a relatively longitudinally movable mandrel, striking shoulders which are brought into engagement by relative longitudinal movement of the mandrel and body in one direction, a pair of interengaging members restraining the body and mandrel against relative movement in said direction, said members being releasable by relative rotation about the body axis to free the body and mandrel for relative movement in said direction, one of said members being rotatable with respect to both the body and mandrel, a connection between the body and mandrel holding them against substantial relative rotation during said relative releasing movement of the members, and yielding means within said body imposing a predetermined resistance to relative releasing movement between the members.

6. In a jar, a body and a relatively longitudinally movable mandrel, striking shoulders which are brought into engagement by relative longitudinal movement of the mandrel and body in one direction, a sleeve rotatable on said mandrel, and interengaging shoulders on said sleeve and body restraining the body and mandrel against relative movement in said direction, said shoulders being releasable by relative rotation about the body axis to free the body and mandrel for relative movement in said direction, and a connection between the body and mandrel holding them against substantial relative rotation during said relative releasing movement of the shoulders, and means imposing a predetermined resistance to relative releasing movement between said shoulders.

7. In a jar, a body and a relatively longitudinally movable mandrel, striking shoulders which are brought into engagement by relative longitudinal movement of the mandrel and body in one direction, a sleeve rotatable on said mandrel, and interengaging shoulders on said sleeve and body restraining the body and mandrel against relative movement in said direction, said shoulders being releasable by relative rotation about the body axis to free the body and mandrel for relative movement in said direction, and a connection between the body and mandrel holding them against substantial relative rotation during said relative releasing movement of the shoulders, and a resiliently deformable medium imposing a predetermined resistance to relative releasing movement between said shoulders.

8. In a jar, a body and a relatively longitudinally movable mandrel, striking shoulders which are brought into engagement by relative longitudinal movement of the mandrel and body in one direction, a pair of interengaging members restraining the body and mandrel against relative movement in said direction, said members being releasable by relative rotation about the body axis to free the body and mandrel for relative movement in said direction, a connection between the body and mandrel holding them against substantial relative rotation during said relative releasing movement of the members, and a resilient medium, compressible longitudinally of the body by relative movement of the mandrel and imposing a predetermined resistance to relative releasing movement between the members.

9. In a jar, a body and a relatively longitudinally movable mandrel, striking shoulders which are brought into engagement by relative longitudinal movement of the mandrel and body in one direction, a sleeve rotatable on said mandrel, and interengaging shoulders on said sleeve and body restraining the body and mandrel against relative movement in said direction, said shoulders being releasable by relative rotation about the body axis to free the body and mandrel for relative movement in said direction, a connection between the body and mandrel holding them against substantial relative rotation during said relative releasing movement of the shoulders, and a spring, compressible longitudinally of the body by relative movement of the mandrel and imposing a predetermined resistance to relative releasing movement between said shoulders.

10. In a jar, a body and a relatively longitudinally movable mandrel, striking shoulders which are brought into engagement by relative longitudinal movement of the mandrel and body in one direction, a sleeve rotatable on said mandrel, and interengaging shoulders on said sleeve and body restraining the body and mandrel against relative movement in said direction, said shoulders being releasable by rotation of said sleeve to free the body and mandrel for relative movement in said direction, and means preventing such releasing rotation of said sleeve until a predetermined longitudinal pull is exerted on the mandrel.

11. In a jar, a body and a relatively longitudinally movable mandrel, striking shoulders which are brought into engagement by relative longitudinal movement of the mandrel and body in one direction, a sleeve rotatable on said mandrel, and interengaging shoulders on said sleeve and body restraining the body and mandrel against relative movement in said direction, said shoulders being releasable by rotation of said sleeve to free the body and mandrel for relative movement in said direction, and a longitudinally compressible spring surrounding the mandrel and preventing such releasing rotation of said sleeve until a predetermined longitudinal pull is exerted on the mandrel.

12. In a jar, a body and a relatively longitudinally movable mandrel, striking shoulders which are brought into engagement by relative longitudinal movement of the mandrel and body in one direction, means resisting relative longitudinal movement between the body and mandrel in said direction, said means comprising a sleeve which rotates on the mandrel and relative to the body to release the body and mandrel for relative movement in said direction, and means holding said sleeve against substantial movement longitudinally of the mandrel.

13. In a jar, a body and a relatively longitudinally movable mandrel, striking shoulders which are brought into engagement by relative longitudinal movement of the mandrel and body in one direction, means resisting relative longitudinal movement between the body and mandrel in said direction, said means comprising a sleeve which rotates on the mandrel and relative to the body to release the body and mandrel for relative movement in said direction, and means within the body and deformable longitudinally thereof for preventing rotation of said sleeve to the point of release until a predetermined pull is exerted on the mandrel.

14. In a jar, a body and a relatively longitudinally movable mandrel, striking shoulders which are brought into engagement by relative longitudinal movement of the mandrel and body in one direction, means resisting relative longitudinal movement between the body and mandrel in said direction, said means comprising a sleeve which rotates on the mandrel and relative to the body to release the body and mandrel for relative movement in said direction, and means within the body and deformable longitudinally thereof for preventing any substantial releasing rotation of said sleeve until a predetermined pull is exerted on the mandrel.

15. In a jar, a body and a relatively longitudinally movable mandrel, striking shoulders which are brought into engagement by relative longitudinal movement of the mandrel and body in one direction, means resisting relative longitudinal movement between the body and mandrel in said direction, said means comprising a sleeve which rotates on the mandrel and relative to the body to release the body and mandrel for relative movement in said direction, and means preventing any substantial releasing rotation of said sleeve until a predetermined pull is exerted on the mandrel, the last mentioned means comprising a second mandrel surrounding sleeve and yielding means pressing it into engagement with the first mentioned sleeve.

16. In a jar, a body and a relatively longitudinally movable mandrel, striking shoulders which are brought into engagement by relative longitudinal movement of the mandrel and body in one direction, means resisting relative longitudinal movement between the body and mandrel in said direction, said means comprising a sleeve which rotates on the mandrel and relative to the body to release the body and mandrel for relative movement in said direction, and means preventing any substantial releasing rotation of said sleeve until a predetermined pull is exerted on the mandrel, the last mentioned means comprising a second mandrel surrounding sleeve in locking engagement with the first mentioned sleeve and preventing any substantial releasing rotation of the latter until a predetermined pull is exerted on the mandrel.

17. In a jar, a body and a relatively longitudinally movable mandrel, striking shoulders which are brought into engagement by relative longitudinal movement of the mandrel and body in one direction, means resisting relative longitudinal movement between the body and mandrel in said direction, said means comprising a sleeve which rotates on the mandrel and relative to the body to release the body and mandrel for relative movement in said direction, and means preventing any substantial releasing rotation of said sleeve until a predetermined pull is exerted on the mandrel, the last mentioned means comprising a second mandrel surrounding sleeve in locking engagement with the first mentioned sleeve and preventing any substantial releasing rotation of the latter until a predetermined pull is exerted on the mandrel and yielding means urging said second mandrel surrounding sleeve longitudinally of the mandrel toward the first mentioned sleeve.

18. In a jar, a body and a relatively longitudinally movable mandrel, striking shoulders which are brought into engagement by relative longitudinal movement of the mandrel and body in one direction, means resisting relative longitudinal movement between the body and mandrel in said direction, said means comprising a sleeve which rotates on the mandrel and relative to the body to release the body and mandrel for relative movement in said direction, and means preventing rotation of said sleeve to the point of release until a predetermined pull is exerted on the mandrel, the last mentioned means comprising a cam engaging said sleeve and yielding means within the body resisting movement of the sleeve relative to said cam.

19. In a jar, a body and a relatively longitudinally movable mandrel, striking shoulders which are brought into engagement by relative longitudinal movement of the mandrel and body in one direction, means resisting relative longitudinal movement between the body and mandrel in said direction, said means comprising a sleeve which rotates on the mandrel and relative to the body to release the body and mandrel for relative movement in said direction, and means preventing rotation of said sleeve to the point of release until a predetermined pull is exerted on the mandrel, the last mentioned means comprising a mandrel surrounding cam sleeve and yielding means pressing it into engagement with the first mentioned sleeve.

20. In a jar, a body and a relatively longitudinally movable mandrel, striking shoulders which are brought into engagement by relative longitudinal movement of the mandrel and body in one direction, said means comprising a sleeve which movement between the body and mandrel in said direction, said means comprising a sleeve which rotates on the mandrel and relative to the body to release the body and mandrel for relative movement in said direction, means for mounting the sleeve on the mandrel and holding the sleeve against substantial movement longitudinally of the mandrel, and means preventing rotation of said sleeve to the point of release until a predetermined pull is exerted on the mandrel, the last mentioned means comprising means integral with the sleeve and body and resisting their relative rotation.

21. In a jar, a body and a relatively longitudinally movable mandrel, striking shoulders which are brought into engagement by relative longitudinal movement of the mandrel and body in one direction, means resisting relative longitudinal movement between the body and mandrel in said direction, said means comprising a sleeve which rotates on the mandrel and relative to the body to release the body and mandrel for relative movement in said direction, and means preventing rotation of said sleeve to the point of release until a predetermined pull is exerted on the mandrel, the last mentioned means comprising a pair of lugs integral respectively with the sleeve and body and resisting their relative rotation.

JAMES T. BARKELEW.
VICTOR F. EHRGOTT.

CERTIFICATE OF CORRECTION.

Patent No. 2,065,261.                                     December 22, 1936.

JAMES T. BARKELEW, ET AL.

It is hereby certified that error appears in the printed specification of the above numbered patent requiring correction as follows: Page 6, second column, line 65, claim 20, for the words "said means comprising a sleeve which" read means resisting relative longitudinal; and that the said Letters Patent should be read with this correction therein that the same may conform to the record of the case in the Patent Office.

Signed and sealed this 25th day of May, A. D. 1937.

Henry Van Arsdale
(Seal)                                 Acting Commissioner of Patents.